US011919236B2

(12) United States Patent
Day et al.

(10) Patent No.: US 11,919,236 B2
(45) Date of Patent: Mar. 5, 2024

(54) SPIN CLEANING METHOD AND APPARATUS FOR ADDITIVE MANUFACTURING

(71) Applicant: Carbon, Inc., Redwood City, CA (US)

(72) Inventors: Ananda Rose Day, San Francisco, CA (US); Kenton J. Kwok, Palo Alto, CA (US); William James Tucker, Mountain View, CA (US)

(73) Assignee: Carbon, Inc., Redwood City, CA (US)

( * ) Notice: Subject to any disclaimer, the term of this patent is extended or adjusted under 35 U.S.C. 154(b) by 343 days.

(21) Appl. No.: 17/272,470

(22) PCT Filed: Sep. 26, 2019

(86) PCT No.: PCT/US2019/053188
§ 371 (c)(1),
(2) Date: Mar. 1, 2021

(87) PCT Pub. No.: WO2020/069152
PCT Pub. Date: Apr. 2, 2020

(65) Prior Publication Data
US 2021/0323234 A1    Oct. 21, 2021

Related U.S. Application Data

(60) Provisional application No. 62/736,648, filed on Sep. 26, 2018.

(51) Int. Cl.
*B29C 64/35* (2017.01)
*B08B 3/08* (2006.01)
(Continued)

(52) U.S. Cl.
CPC .............. *B29C 64/35* (2017.08); *B08B 3/08* (2013.01); *B08B 7/0071* (2013.01); *B08B 7/02* (2013.01);
(Continued)

(58) Field of Classification Search
CPC ..... B29C 64/35; B29C 64/357; B29C 64/129; B29C 2071/0027; B29C 2071/0045;
(Continued)

(56) References Cited

U.S. PATENT DOCUMENTS 3,013,365 A    12/1961  Harper
4,087,924 A     5/1978  Fujimoro et al.
(Continued)

FOREIGN PATENT DOCUMENTS

CN    104303105 A      1/2015
DE    102014010501 A1  1/2016
(Continued)

OTHER PUBLICATIONS

Dendukuri, Dhananjay, et al., "Continuous-flow lithography for high-throughput microparticle synthesis", Nature Materials, 5, 2006, 365-369.

(Continued)

*Primary Examiner* — Nahida Sultana
(74) *Attorney, Agent, or Firm* — Myers Bigel, P.A.

(57) ABSTRACT

A method of separating excess resin from at least one object includes: (a) stereolithographically producing at least one object, each object having at least one retention feature (32) formed thereon, each object carrying excess resin on a surface thereof; then (b) mounting each object on at least one transfer frame (21), each transfer frame having at least one retention member (22) that mates with the retention feature; (c) connecting each transfer frame to a rotor with the at least one object carried thereon; (d) centrifugally separating excess resin from each object by spinning the rotor with each transfer frame connected thereto while the at least one object remains connected to each transfer frame by the retention (Continued)

feature; then (e) removing each transfer frame from the rotor, with excess resin separated from each at least one object thereon.

26 Claims, 7 Drawing Sheets

(51) Int. Cl.
*B08B 7/00* (2006.01)
*B08B 7/02* (2006.01)
*B08B 7/04* (2006.01)
*B29C 64/129* (2017.01)
*B29C 64/357* (2017.01)
*B33Y 30/00* (2015.01)
*B33Y 40/20* (2020.01)
*B33Y 10/00* (2015.01)

(52) U.S. Cl.
CPC .............. *B08B 7/04* (2013.01); *B29C 64/357* (2017.08); *B33Y 30/00* (2014.12); *B33Y 40/20* (2020.01); *B08B 2220/04* (2013.01); *B29C 64/129* (2017.08); *B33Y 10/00* (2014.12)

(58) Field of Classification Search
CPC ..... B29C 71/0009; B29C 64/124; B08B 3/08; B08B 7/0071; B08B 7/02; B08B 7/04; B08B 2220/04; B08B 3/02; B33Y 30/00; B33Y 40/20; B33Y 10/00
See application file for complete search history.

(56) References Cited

U.S. PATENT DOCUMENTS

| | | | |
|---|---|---|---|
| 4,688,513 A * | 8/1987 | Eberle | G01N 1/2813 118/503 |
| 5,122,441 A | 6/1992 | Lawton et al. | |
| 5,236,637 A | 8/1993 | Hull | |
| 5,248,456 A | 9/1993 | Evans et al. | |
| 5,355,638 A | 10/1994 | Hoffman | |
| 5,391,072 A | 2/1995 | Lawton et al. | |
| 5,482,659 A | 1/1996 | Sauerhoefer | |
| 7,438,846 B2 | 10/2008 | John | |
| 7,709,544 B2 | 5/2010 | Doyle et al. | |
| 7,845,930 B2 | 12/2010 | Shkolnik et al. | |
| 7,892,474 B2 | 2/2011 | Shkolnik et al. | |
| 8,110,135 B2 | 2/2012 | El-Siblani | |
| 8,735,049 B2 | 5/2014 | Vest | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,498,920 B2 | 11/2016 | Desimone et al. | |
| 9,511,546 B2 | 12/2016 | Chen et al. | |
| 9,592,539 B2 | 3/2017 | Dunn et al. | |
| 9,993,974 B2 | 6/2018 | Desimone et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,596,755 B2 | 3/2020 | Desimone et al. | |
| 10,618,215 B2 | 4/2020 | Desimone et al. | |
| 10,913,206 B2 | 2/2021 | Donovan et al. | |
| 11,433,658 B2 * | 9/2022 | Friedrich | B33Y 30/00 |
| 11,440,259 B2 * | 9/2022 | Price | B29C 64/35 |
| 2003/0206820 A1 | 11/2003 | Keicher et al. | |
| 2004/0148048 A1 | 7/2004 | Farnworth | |
| 2004/0159340 A1 | 8/2004 | Hiatt et al. | |
| 2006/0022379 A1 | 2/2006 | Wicker et al. | |
| 2007/0179655 A1 | 8/2007 | Farnworth | |
| 2008/0087298 A1 | 4/2008 | Katou et al. | |
| 2009/0283119 A1 * | 11/2009 | Moussa | B29C 64/35 134/147 |
| 2011/0089610 A1 | 4/2011 | El-Siblani et al. | |
| 2011/0309554 A1 | 12/2011 | Liska et al. | |
| 2013/0292862 A1 | 11/2013 | Joyce | |
| 2013/0295212 A1 | 11/2013 | Chen et al. | |
| 2015/0331402 A1 | 11/2015 | Lin et al. | |
| 2015/0360419 A1 | 12/2015 | Willis et al. | |
| 2016/0137839 A1 | 5/2016 | Rolland et al. | |
| 2017/0129167 A1 | 5/2017 | Castanon | |
| 2017/0129169 A1 | 5/2017 | Batchelder et al. | |
| 2017/0173872 A1 | 6/2017 | McCall et al. | |
| 2017/0312763 A1 | 11/2017 | Mackel et al. | |
| 2018/0029311 A1 | 2/2018 | Depalma et al. | |
| 2018/0304526 A1 | 10/2018 | Feller et al. | |
| 2019/0029311 A1 | 1/2019 | Shin et al. | |
| 2019/0126547 A1 | 5/2019 | Desimone et al. | |
| 2019/0224917 A1 | 7/2019 | Venkatakrishnan et al. | |
| 2019/0389127 A1 | 12/2019 | Desimone et al. | |
| 2020/0139617 A1 | 5/2020 | Desimone et al. | |
| 2020/0215811 A1 | 7/2020 | Friedrich et al. | |
| 2020/0337813 A1 * | 10/2020 | Kirchner | B33Y 30/00 |
| 2021/0086450 A1 | 3/2021 | Murillo et al. | |
| 2021/0308947 A1 * | 10/2021 | Diez | B29C 64/35 |

FOREIGN PATENT DOCUMENTS

| | | |
|---|---|---|
| EP | 1700656 A2 | 9/2006 |
| EP | 1700686 A2 | 9/2006 |
| JP | 2001342204 A | 12/2001 |
| JP | 2015120261 A | 7/2015 |
| WO | 0172501 A1 | 10/2001 |
| WO | 2011086450 A2 | 7/2011 |
| WO | 2017194177 A1 | 11/2017 |
| WO | 2018111548 A1 | 6/2018 |
| WO | 2019209732 A1 | 10/2019 |

OTHER PUBLICATIONS

Dendukuri, Dhananjay, et al., "Stop-flow lithography in a microfluidic device", The Royal Society of Chemistry, Lab on a Chip, 7, 2007, 818-828.
Dendurkuri, et al., ", Modeling of Oxygen-Inhibited Free Radical Photopolymerization in PDMS Microfluidic Device, Macromolecules, 2008, 41 (22), 8547-8556, published Oct. 21, 2008".
Morelli, Dean , "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, 37 pp.
Pan, Y , et al., "A Fast Mask Projection Stereolithography Process for Fabricating Digital Models in Minutes", J. Manufacturing Sci. and Eng. 134, Oct. 2012, 051011-1.
Stern, S. A., "The 'Barrer' Permeability Unit", Journal of Polymer Science: Part A-2, 6(11), 1968, 1933-1934.
Tumbleston, John R., et al., "Continuous liquid interface production of 3D Objects", Science, 347(6228), 2015, 1349-1352.
Yasuda, H. , et al., "Permeability of Polymer Membranes to Dissolved Oxygen", Journal of Polymer Science, 4, 1966, 1314-1316.
International Search Report and Written Opinion for PCT/US2019/053188 dated Dec. 19, 2019, 13 pages.

* cited by examiner

SPIN CLEANING METHOD AND APPARATUS FOR ADDITIVE MANUFACTURING

RELATED APPLICATIONS

This application is a 35 U.S.C. § 371 national phase entry of International Application No. PCT/US2019/053188, filed Sep. 26 2019, which claims priority from U.S. Provisional Application No. 62/736,648, filed Sep. 26, 2018, the disclosures of which are hereby incorporated by reference herein in their entirety.

FIELD OF THE INVENTION

The present invention concerns methods of additive manufacturing, and particularly concerns methods of extracting or removing excess resin from objects following their production by top-down or bottom-up stereolithography.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into a pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

Stereolithography resins—both conventional and dual cure—are generally viscous, and excess, unpolymerized, resins adhere to objects after they have been produced. Various wash techniques for removing excess resin are known (see, for example, W. McCall et al., Wash liquids for use in additive manufacturing with dual cure resins, U.S. Patent Application Pub. No. 2017/0173872), but such techniques are generally slow, are not adapted for high throughput manufacturing situations, may require large amounts of wash liquids, and—because the excess resin is carried away in the wash liquid—generally preclude collection and use of the excess resin in subsequent stereolithographic production steps. Accordingly, there is a need for new techniques for removing excess resin from additively manufactured products.

SUMMARY OF THE INVENTION

A method of separating excess resin from at least one object includes: (a) stereolithographically producing at least one object, each object having at least one retention feature formed thereon, each object carrying excess resin on a surface thereof; then (b) mounting the at least one object on at least one transfer frame, each transfer frame having at least one retention member that mates with the retention feature; (c) connecting each transfer frame to a rotor with the at least one object carried thereon; (d) centrifugally separating excess resin from each object by spinning the rotor with each transfer frame connected thereto while the at least one object remains connected to each transfer frame by the retention feature; then (e) removing each transfer frame from the rotor, with excess resin separated from each at least one object thereon.

In some embodiments, the retention feature includes at least one channel, at least one slot, at least one ledge, a frame partially or completely surrounding the object, or a combination of any thereof (e.g., a pair of channels formed in the object).

In some embodiments, the retention member comprises a pair of rods.

In some embodiments, the rotor includes a drive, a base plate connected to the drive, and optionally (but in some embodiments preferably) a removable top plate, with each transfer frame configured for connecting to the base plate, and to the removable top plate when present.

In some embodiments, the rotor further includes a plurality of spacer posts connected to or extending from the base plate, the spacer posts configured for positioning the removable top plate above and oriented with each transfer frame.

In some embodiments, each transfer frame includes: a first interconnecting element configured for removably connecting the transfer frame to the base plate; and optionally, but in some embodiments preferably, a second interconnecting element (continuous with or separate from the retention member) configured for removably connecting the top plate when present to the transfer frame.

In some embodiments, a plurality of objects (e.g., at least two or three) are mounted on each transfer frame.

In some embodiments, a plurality of transfer frames (e.g., at least two, three, four, five or six) are connected to the rotor.

In some embodiments, the centrifugally separating step is carried out with each transfer frame mounted perpendicularly to the base plate, and/or parallel to an axis of rotation of the rotor.

In some embodiments, the method further includes warming the excess resin sufficiently to reduce the viscosity thereof during the centrifugally separating step.

In some embodiments, the method further includes applying a solvent (e.g., by spraying) to the excess resin in an amount sufficient to reduce the viscosity thereof during the centrifugally separating step.

In some embodiments, the centrifugally separating step is carried out in a gas (e.g., air, an inert gas) at ambient pressure or a pressure less than ambient pressure.

In some embodiments, the spinning is carried out at a speed of from 100, 200 or 400 revolutions per minute (rpm) to 600, 800, 1,000 or 1,2000 rpm, or more.

In some embodiments, the method further includes: (f) collecting the centrifugally separated excess resin, then (g) optionally combining the centrifugally separated excess resin with additional resin; and then (h) stereolithographically producing at least one additional object from the centrifugally separated excess resin and/or the additional resin.

In some embodiments, each said object comprises an intermediate object produced from a dual cure resin, the method further comprising: (i) optionally separating each object from each transfer frame; and then (j) further curing (e.g., by heating and/or microwave irradiating) each object (on or off each transfer frame) to produce a finished object.

In some embodiments, each object includes a lattice and/or includes one or more internal channels or cavities and has at least one opening formed therein in fluid communication with the channel or cavity and configured for excess resin within the channel or cavity to flow therethrough and out of the channel or cavity during the centrifugally separating step.

An apparatus useful for separating excess resin from at least one stereolithographically produced object includes:

(a) optionally (for example, when the apparatus is prepared for use or in use) at least one stereolithographically produced object, each object having at least one retention feature formed thereon, each object carrying excess resin on a surface thereof;

(b) at least one transfer frame, each transfer frame having at least one retention member that mates with the retention feature(s) formed on the objects, with at least one stereolithographically produced object mounted on each at least one transfer frame; and (c) a rotor, with each transfer frame connected to the rotor (e.g., removably connected).

In some embodiments, the retention feature includes at least one channel, at least one slot, at least one ledge, a frame partially or completely surrounding the object, or a combination of any thereof thereof (e.g., a pair of channels formed in the object).

In some embodiments, the retention member includes a pair of rods.

In some embodiments, the rotor includes a drive, a base plate connected to the drive, and optionally (but in some embodiments preferably) a removable top plate, with each transfer frame configured for connecting to the base plate, and to the removable top plate when present.

In some embodiments, the rotor further includes a plurality of spacer posts connected to or extending from the base plate, the spacer posts configured for positioning the removable top plate above and oriented with each transfer frame.

In some embodiments, each transfer frame includes: a first interconnecting element configured for removably connecting the transfer frame to the base plate; and optionally, but in some embodiments preferably, a second interconnecting element (continuous with or separate from the retention member) configured for removably connecting the top plate when present to the transfer frame.

In some embodiments, a plurality of the objects (e.g., at least two or three) are mounted on each at least one transfer frame.

In some embodiments, a plurality of transfer frames (e.g., at least two, three, four, five or six) are connected to the rotor.

In some embodiments, each transfer frame is mounted perpendicularly to the base plate, and/or parallel to an axis of rotation of the rotor.

In some embodiments, each object includes a lattice and/or includes one or more internal channels or cavities and has at least one opening formed therein in fluid communication with the channel or cavity and configured for excess resin within the channel or cavity to flow therethrough and out of the channel or cavity when the excess resin is centrifugally separated from each object by spinning the rotor with each transfer frame connected thereto while each at least one object remains connected to each transfer frame by the retention feature.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
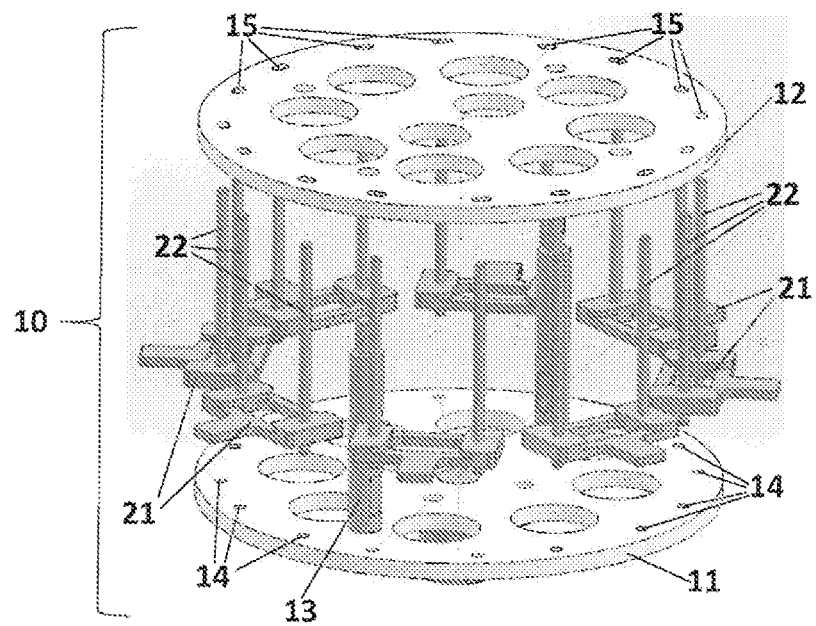
FIG. 1 is an exploded, perspective view of a rotor and transfer frame assembly for carrying out the present invention.
Figure 2:
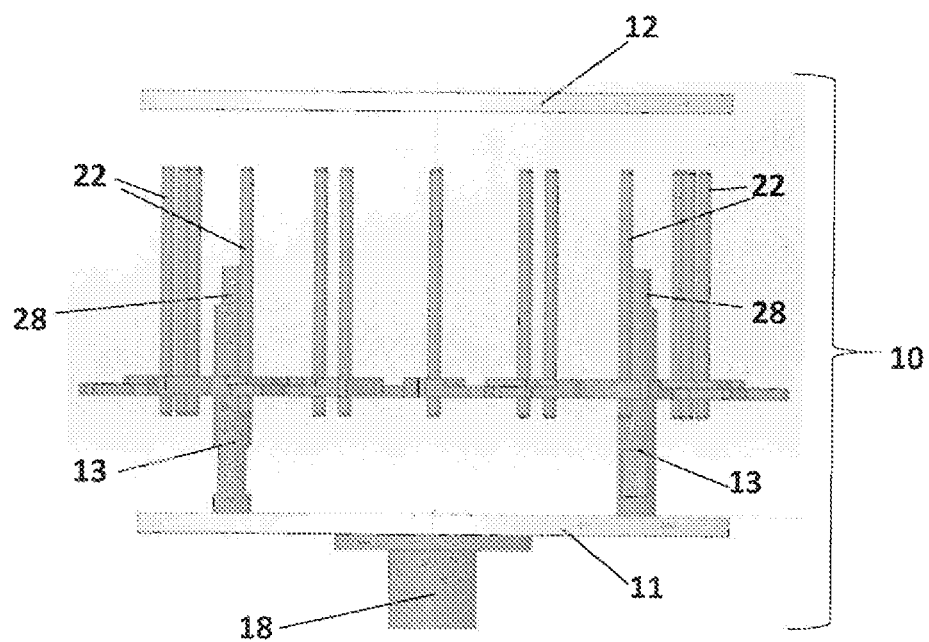
FIG. 2 is a side view of the rotor and transfer frame assembly of FIG. 1.
Figure 3:
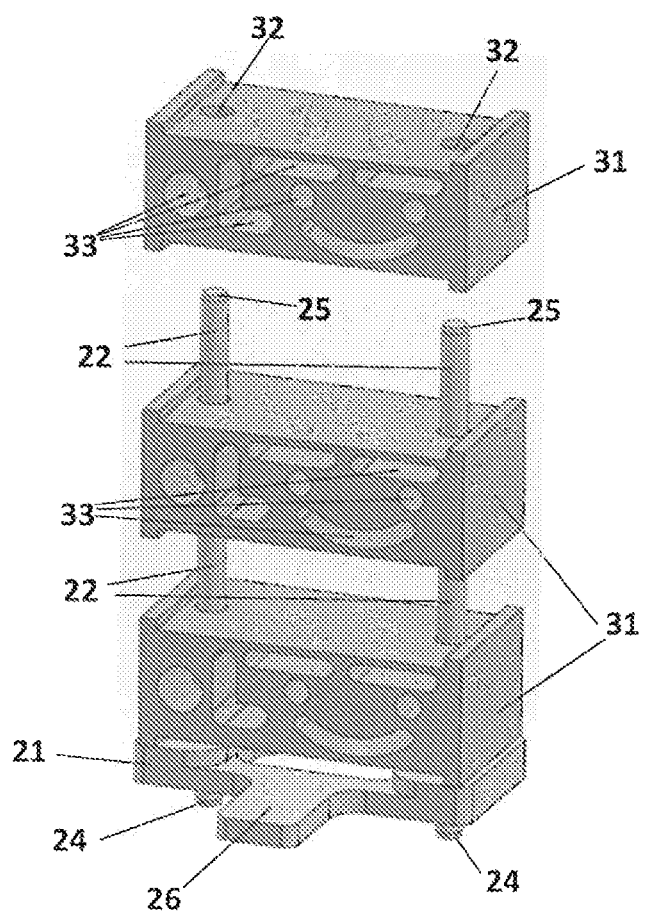
FIG. 3 is a perspective view of a plurality of representative additively manufactured objects being mounted on a transfer frame.
Figure 4:
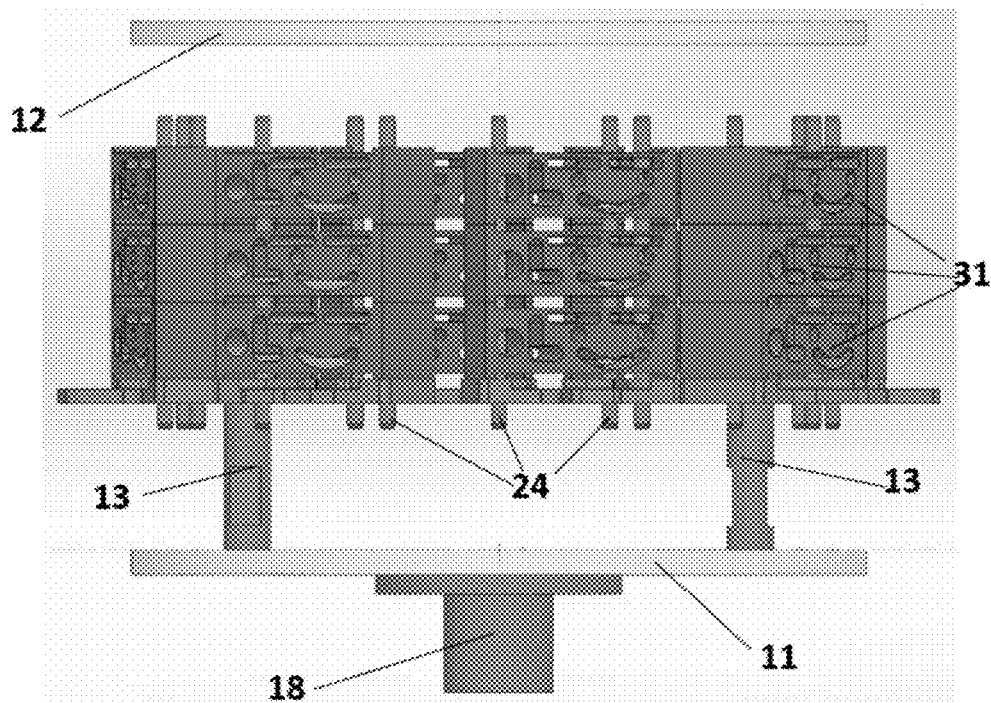
FIG. 4 is an exploded side view of a rotor and plurality of transfer frames, similar to that of FIG. 2, but with the transfer frames all now carrying additively manufactured objects.
Figure 5:
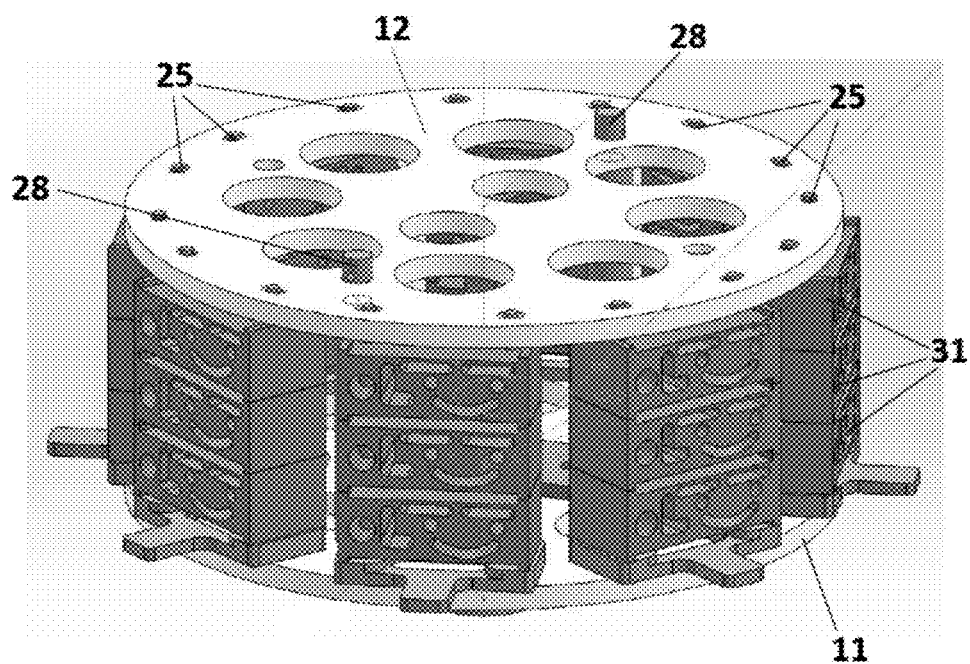
FIG. 5 is a perspective view of a rotor and transfer frame assembly, assembled, and with each of the transfer frames now carrying a plurality of additively manufactured products.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Stereolithography Apparatus and Resins

Resins for additive manufacturing are known and described in, for example, DeSimone et al., U.S. Pat. Nos. 9,211,678; 9,205,601; and 9,216,546. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out particular embodiments of CLIP include, but are not limited to: Batchelder et al., Continuous liquid interface production system with viscosity pump, U.S. Patent Application Pub. No. 2017/0129169 (May 11, 2017); Sun and Lichkus, Three-dimensional fabricating system for rapidly producing objects, U.S. Patent Application Pub. No. 2016/0288376 (Oct. 6, 2016); Willis et al., 3d print adhesion reduction during cure process, U.S. Patent Application Pub. No. 2015/0360419 (Dec. 17, 2015); Lin et al., Intelligent 3d printing through optimization of 3d print parameters, U.S. Patent Application Pub. No. 2015/0331402 (Nov. 19, 2015); and D.

Castanon, Stereolithography System, U.S. Patent Application Pub. No. 2017/0129167 (May 11, 2017).

After the object is formed, it is typically cleaned as described below, and in some embodiments then further cured, preferably by baking (although further curing may in some embodiments be concurrent with the first cure, or may be by different mechanisms such as contacting to water, as described in U.S. Pat. No. 9,453,142 to Rolland et al.).

2. Resin Separation Methods and Apparatus

A non-limiting example of methods and apparatus (10) of the invention is given in FIGS. 1-5 herein. The method includes the steps of:
 (a) stereolithographically producing at least one object (31), each object having at least one retention feature (32) formed thereon, each object carrying excess resin on a surface thereof; then
 (b) mounting each of the at least one object on at least one transfer frame (21), each transfer frame having at least one retention member (22) that mates with the retention feature;
 (c) connecting each transfer frame to a rotor with the at least one object carried thereon;
 (d) centrifugally separating excess resin from each object by spinning the rotor with each transfer frame connected thereto while the at least one object remains connected to each transfer frame by the retention feature; then
 (e) removing transfer frame from the rotor, with excess resin separated from each of the at least one object thereon.

The rotor R comprises a drive D (the shaft thereof shown in the FIG. 18)), a base plate (11) connected to the drive or drive shaft, and optionally (but in some embodiments preferably) a removable top plate (12), with the transfer frames configured for connecting to the base plate, and to the removable top plate when present. Optionally, but in some embodiments preferably, the rotor can include a plurality (e.g., two or three) of spacer posts (28) connected to the base plate, the spacer posts configured for positioning the removable top plate above and oriented with the transfer frames.

While in a preferred embodiment, the retention feature (which is formed during the additive manufacturing step) comprises a pair of channels (32) and the corresponding retention member comprises a pair of rods (22) on each transfer frame (21), the retention feature (and the corresponding retention member) may take any of a variety of forms, such as at least one channel, at least one slot, at least one ledge, a frame partially or completely surrounding the object (e.g., and connected to the object by frangible supports or interconnects) or a combination of any thereof thereof (e.g., a pair of channels). Note that the retention feature and corresponding retention member may be in any orientation, including both perpendicular to the base plate (as shown in the Figures), parallel to the base plate, etc., including combinations thereof.

In a preferred embodiment, each transfer frame includes a first interconnecting element (such as a pair of stubs 24) configured for removably connecting the transfer frame to the base plate (such as by a pair of sockets 14); and optionally, but in some embodiments preferably, a second interconnecting element, continuous with or separate from the retention member (such as extended end portions 25) configured for removably connecting the top plate when present to the transfer frame (such as by a pair of sockets 15).

As will be seen from the Figures, in some embodiments a plurality of objects (e.g., at least two or three) are mounted on each the at lest one transfer frame, and/or a plurality of transfer frames (e.g., at least two, three, four, five or six) are connected to the rotor (preferably in a balanced configuration).

Figure 6:
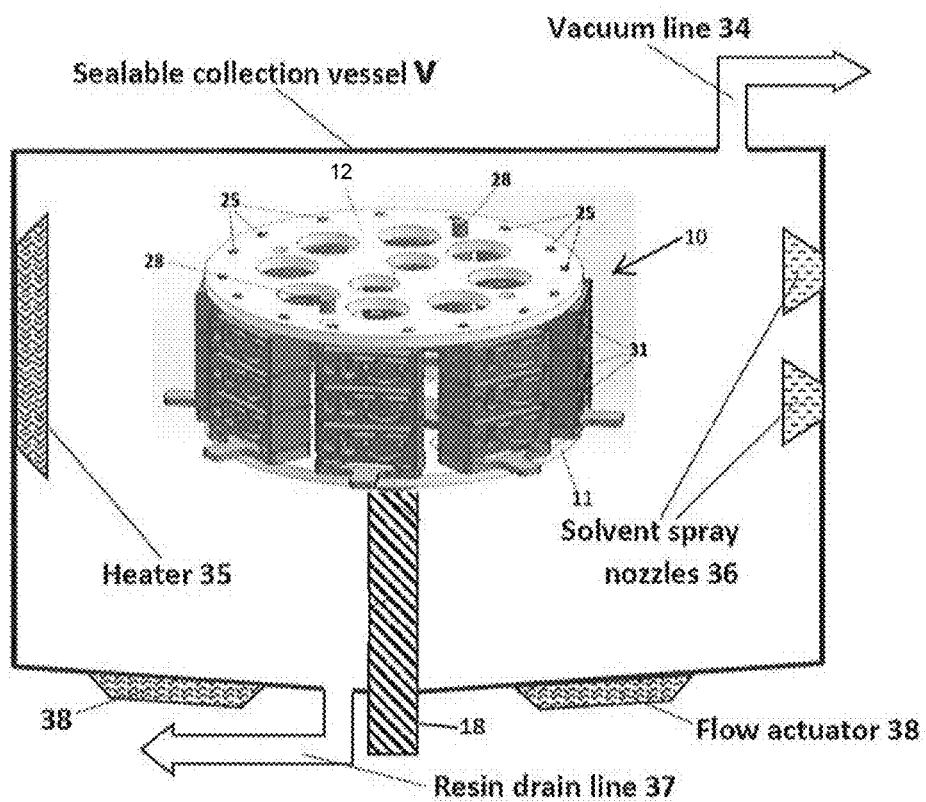
FIG. 6 schematically illustrates the apparatus of FIG. 5 in a collection chamber or vessel.

As indicated by the placement of drive shaft 18, the centrifugally separating step is carried out with each transfer frame mounted perpendicularly to the base plate, and/or parallel to the rotor axis of rotation. As shown in FIG. 6, the apparatus 10 may be placed in an enclosed chamber or vessel V, which can optionally include one or more heaters 35 (e.g., radiant heaters) configured for warming the excess resin sufficiently to reduce the viscosity thereof during the centrifugally separating step (and thereby reducing the maximum speed at which rotation is carried out, and/or the duration of the centrifugally separating step). Similarly, the apparatus chamber may include one or more spray nozzles 36 configured to apply a solvent such as isopropanol (e.g., by spraying) to the excess resin in an amount sufficient to reduce the viscosity thereof during the centrifugally separating step, and again reduce the maximum speed or duration of the separating step. Air blades or air jets may be included in addition to, or instead of, such spray nozzles, again to aid in removal of excess resin from the objects. And, optionally, the chamber can be configured with a vacuum line and/or source 34, and/or gas source, configured so that the centrifugally separating step is carried out in a gas (e.g., air, an inert gas) at ambient pressure or a pressure less than ambient pressure.

The collection vessel can be provided with a hood, lid, or access door, and appropriate seal, so that the pressure therein may be reduced below ambient pressure via the vacuum line 34, sufficiently to reduce drag on the objects as they are spun in the gas atmosphere. The separating step can be carried out in a gas, typically air at ambient pressure, but a supply line (not shown) for an inert gas such as argon, nitrogen, or carbon dioxide can be included, if a resin and/or solvent is volatile or flammable.

A resin drain line 37 can be included to facilitate collection of resin, such as when resin is to be recycled to a subsequent stereolithographic production step, and flow actuators 38 (such as shakers, vibrators, ultrasonic vibrators, etc.) can be provided in operative association with the collection vessel to encourage flow of the collected, viscous, resin. One or more of these features may be useful for the production of objects that are dental models and/or dies, which may be formed by photopolymerizing a viscous resin. The collection vessel may include a removable liner (not shown), such as a rigid or flexible polymer liner, to aid in cleaning the vessel, and/or in collecting excess resin. Similarly, the objects may be wrapped or covered with a removable cover (not shown) such as a rigid or flexible polymer wrap or cover, to aid in collection of excess resin in a more localized fashion.

The time and duration of the spinning (e.g., in the chamber or vessel V) will depend on factors such as the size and shape of the objects, the strength of the materials from which the objects are produced, the viscosity of the resin, and the like, but in general the spinning can be carried out at a (maximum) speed of from 100, 200 or 400 revolutions per minute (rpm) to 600, 800, 1,000 or 1,2000 rpm, or more.

In some embodiments, the chamber can include collection features, such as drains (e.g., the resin drain line 37) and associated pipes to reservoirs, for collecting resin spun off the object(s), which may then be discarded, recycled, or reused. Thus the method may further include:

(f) collecting the centrifugally separated excess resin, then (g) optionally combining the centrifugally separated excess resin with additional resin; and then (h) stereolithographically producing at least one additional object from the centrifugally separated excess resin and/or the additional resin.

The objects themselves may be solid, or may comprise a lattice (e.g., a regular or irregular, three-dimensional, open lattice comprised of interconnected struts) and/or can include one or more internal channels or cavities and has at least one opening (33) formed therein, which opening is in fluid communication with the channel or cavity and configured for excess resin within the channel or cavity to flow therethrough and out of the channel or cavity during the centrifugally separating step. In some embodiments the objects may be produced from a conventional or "single cure" resin, while in other embodiments the objects are produced from a "dual cure" resin such as described above. In the latter case, the method may further include (i) optionally separating each object from each transfer frame; and then (j) further curing (e.g., by heating and/or microwave irradiating) the object (on or off the transfer frame) to produce a finished object.

Additional details on dual cure resins and further curing of objects made from dual cure resins are given in, among other locations, Rolland et al., U.S. Pat. Nos. 9,676,963; 9,598,606; and 9,453,142.

3. Resin Dispensing and Additive Manufacturing Steps

Figure 7:
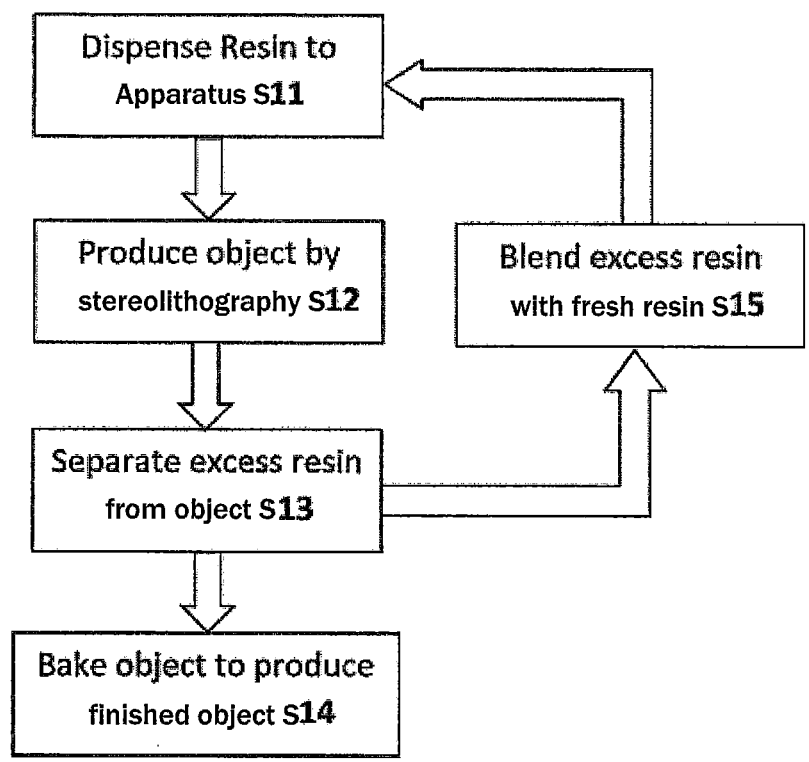
FIG. 7 is a flowchart illustrating operations according to embodiments of the present invention.
Figure 8:
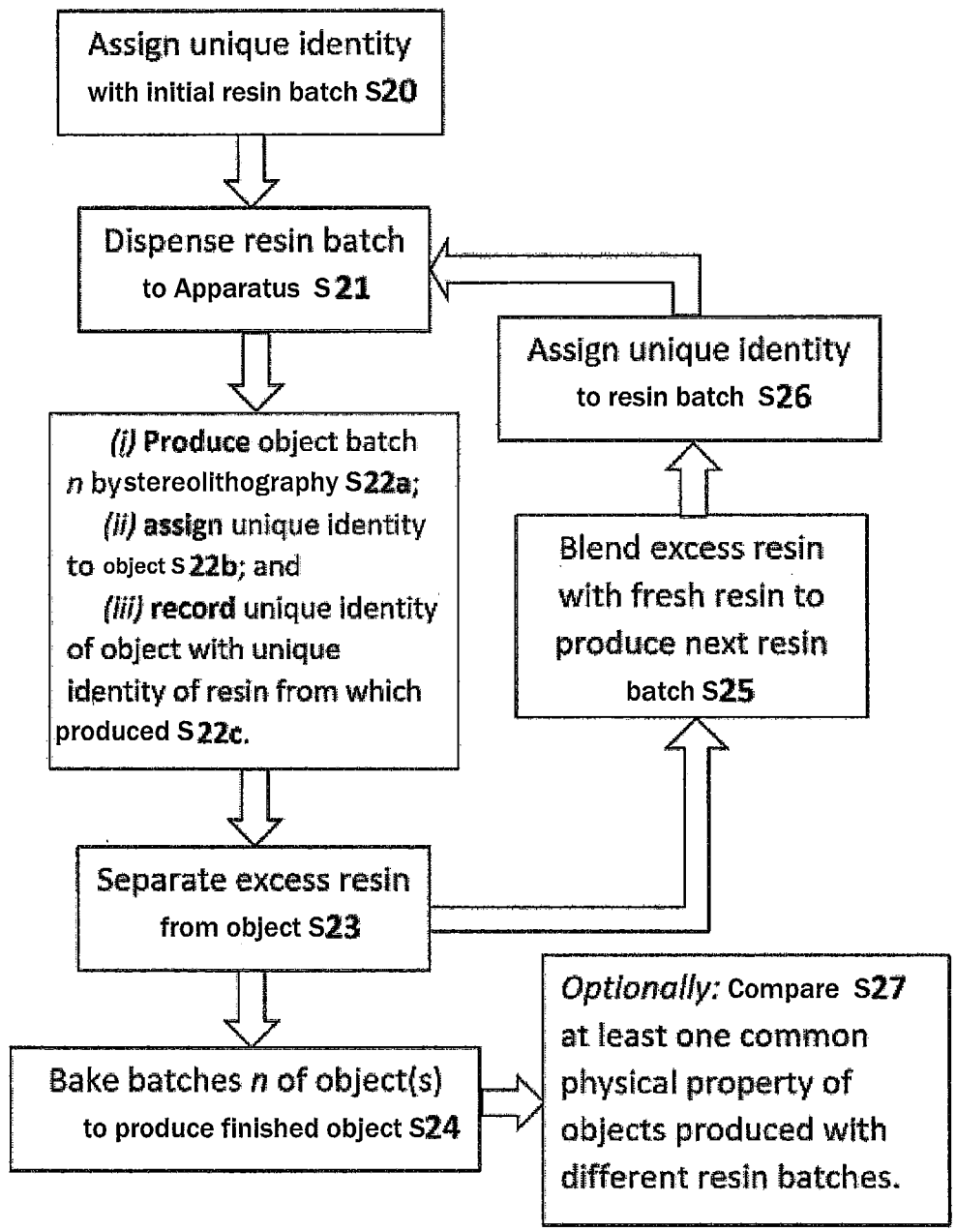
FIG. 8 is a flowchart illustrating operations according to embodiments of the present invention.

Resins may be dispensed (FIG. 7 step S11; FIG. 8 step S21) in any suitable manner, including as single component (1K) systems, or provided as two component (2K) systems that are mixed together when dispensed (e.g., blended upon dispensing). Dispensing may be manual or automated, and may employ a metering and dispensing device such as described in J. Rolland, C. Converse, O Nazarian, and M. Panzer, PCT Patent Application Publication No. WO 2018/237038 (published 27 Dec. 2018), the disclosure of which is incorporated herein by reference.

Techniques for producing an intermediate object, or "green" intermediate, from such resins by additive manufacturing (FIG. 7 step S12; FIG. 8 step S22a) are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., U.S. Patent Application Pub. No. 2017/0129169 (May 11, 2017); Sun and Lichkus, U.S. Patent Application Pub. No. 2016/0288376 (Oct. 6, 2016); Willis et al., U.S. Patent Application Pub. No. 2015/0360419 (Dec. 17, 2015); Lin et al., U.S. Patent Application Pub. No. 2015/0331402 (Nov. 19, 2015); D. Castanon, U.S. Patent Application Pub. No. 2017/0129167(May 11, 2017); B. Feller, U.S. Pat App. Pub. No. 2018/0243976 (published Aug. 30, 2018); M. Panzer and J. Tumbleston, U.S. Pat App Pub. No. 2018/0126630 (published May 10, 2018); and K. Willis and B. Adzima, U.S. Pat App Pub. No. 2018/0290374 (Oct. 11, 2018).

4. Resin Recovery and Return; Baking

An embodiment of the present invention is illustrated in the chart of FIG. 7. The method, for producing multiple batches of objects by stereolithography, includes the steps of:

(a) dispensing an initial or subsequent batch of dual cure resin (S11) into a stereolithography apparatus, the resin comprising a light polymerizable component and a heat polymerizable component;

(b) producing (S12) an intermediate object by light polymerization (typically in an exothermic polymerization reaction) of the resin in the apparatus, wherein the intermediate object retains excess resin on the surface thereof; then (c) separating (S13) excess resin from the intermediate object;

(d) blending (S15) the excess resin with additional dual cure resin to produce a subsequent batch of dual cure resin;

(e) repeating steps (a) through (c), and optionally repeating step (d), to produce additional object(s); and (f) further curing the objects, such as by baking (S14) the objects (e.g., by heating and/or microwave irradiating), together or separately, to produce multiple batches of objects.

The embodiment of FIG. 8 is similar to that of FIG. 7, with dispensing (S21), producing (S22a), separating (S23), blending (S25), and baking (S24) steps carried out in like manner. However, the embodiment of FIG. 8 further includes the steps of assigning a unique identity to the initial resin batch (S20) and to subsequent resin batches (S26), assigning a unique identity to the objects produced (S22b), and recording the unique identity of each object produced in association with the unique identity of the resin batch from which each object is produced (S22c). Such unique identities can be assigned to resins and objects, and recorded to a database, by any suitable means, such as described in J. Desimone, R. Goldman, S. Pollack, and R. Liu, PCT Patent Application Publication No. WO2018/169826 (published 20 Sep. 2018) and J. Rolland, C. Converse, O Nazarian, and M. Panzer, PCT Patent Application Publication No. WO 2018/237038 (published 27 Dec. 2018), the disclosures of which are incorporated herein by reference.

In some embodiments, steps (a) through (c) are repeated at least twice (e.g., at least three times) and step (d) is repeated at least once (e.g., at least two times).

Any of a variety of different types of objects can be produced, including open lattice structures (e.g., a cushion or pad, such as a midsole or helmet liner), dental models, or any of the variety of objects described in J. Rolland et al., U.S. Pat. Nos. 9,676,963, 9,453,142 and 9,598,606, the disclosures of which are incorporated herein by reference.

In some embodiments, considerable excess resin is retained on the surface of the intermediate object, which the present invention advantageously captures and returns for use, rather than washes off for disposal. For example, in some embodiments, excess resin is retained on the intermediate object in an amount by weight of at least 40, 60 or 80 percent as compared to the weight of the intermediate object (that is, the amount of retained resin equals weight of the intermediate object itself, multiplied by at least 0.4, 0.6, or 0.8).

Separating. The separating step can be carried out by any suitable means, such as by centrifugal separation, gravity drainage, wiping (e.g. with a compressed gas) or a combination thereof. Centrifugal separation in an enclosed chamber (e.g., the chamber V) is currently preferred, where the collected excess resin can be drained, continuously or in a batch-wise fashion, from the enclosed chamber. When centrifugal separation is employed, the objects can be retained on their build platforms and those build platforms mounted on a rotor for spinning; the objects removed from their build platforms and placed in a basket for spinning, the objects can be removed from their build platforms and secured to retention members (such as skewers for pre-formed retention openings intentionally included in the objects), etc. See, e.g., FIGS. 1-6. In some embodiments, the interior of the centrifugal separating apparatus is coated with a non-stick material, such as described by Aizenberg et. al. in U.S. 2015/0209198 A1, the disclosure of which is incorporated by reference herein.

Blending. The excess resin can be blended with additional dual cure resin in a volume ratio of from 10:90, 20:80 or 30:70, up to 40:60, 50:50, or 60:40 (excess resin:additional dual cure resin). Blending of the collected excess resin with additional dual cure resin (typically, the additional resin being of the same composition as was the collected excess resin prior to the excess resin passing through the producing step) can be carried out continuously or in a batch-wise manner by any suitable technique. In one embodiment, the blending is carried out in a drum with an immersion mixer, with additional resin being added until the desired viscosity of the entire blended resin is achieved. Thus, in some embodiments, the excess resin of step (b) has a viscosity greater than that of the dual cure resin of step (a), and the subsequent batch of dual cure resin of step (d) has a viscosity less than that of the excess resin (reduced viscosity being advantageous in the stereolithography processes). In some embodiments, the initial batch and subsequent batches of dual cure resin have a viscosity of from 1,000 or 2,000 centipoise to 60,000 or 100,000 centipoise at 25 degrees centigrade; and in some embodiments, the excess dual cure resin of step (b) has a viscosity at least 1,000 or 2,000 centipoise greater (or 10 or 20 percent greater) than that of the dual cure resin of step (a).

Baking. After excess resin has been separated from the intermediate object, the object is then further cured, such as by heating. Heating may be active heating (e.g., baking in an oven, such as an electric, gas, solar oven or microwave oven, or combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments also be employed.

Washing. While wash steps can be included in some embodiments of the present invention, before and/or after the separating step, in preferred embodiments wash steps are avoided (particularly prior to the separating step), and hence the excess resin is free of wash liquid in the blending step. While this serves to simplify resin blending, nevertheless, in some embodiments where an initial (or "primer") resin contains at least one diluent in a given amount, that diluent can then be used as an aid during separation (e.g., sprayed on objects prior to or during centrifugal separation), and then the (now diluted) excess resin blended with additional resin that contains a reduced amount of that diluent (that is, less than that of the primer resin), so that the appropriate chemical composition and viscosities are achieved in the blended resin.

Testing. The physical properties of objects produced by the present invention can be determined and compared in accordance with known techniques. See, e.g., T. R. Crompton, Physical Testing of Plastics (Smithers Rapra Technology Ltd. 2012). Objects produced from different resin batches can be compared, for example, to insure uniformity or consistency of objects within a given tolerance even though produced from different resin batches. Where unique identifiers are applied to resins and objects, and the information stored or saved, the comparing step can be facilitated by (i) determining the unique identity of each the object, and (ii) retrieving the unique identity of the resin batch recorded for the object. Examples of physical properties that can be tested and compared include, but are not limited to, flexibility, elasticity, tensile strength, tear strength, impact resistance, elongation at break, strain at yield, notch sensitivity, toughness, abrasion resistance, shear strength, deformation under load, permanent deformation, coefficient of friction, fatigue index, color, clarity, etc.

Example System.

Figure 9:
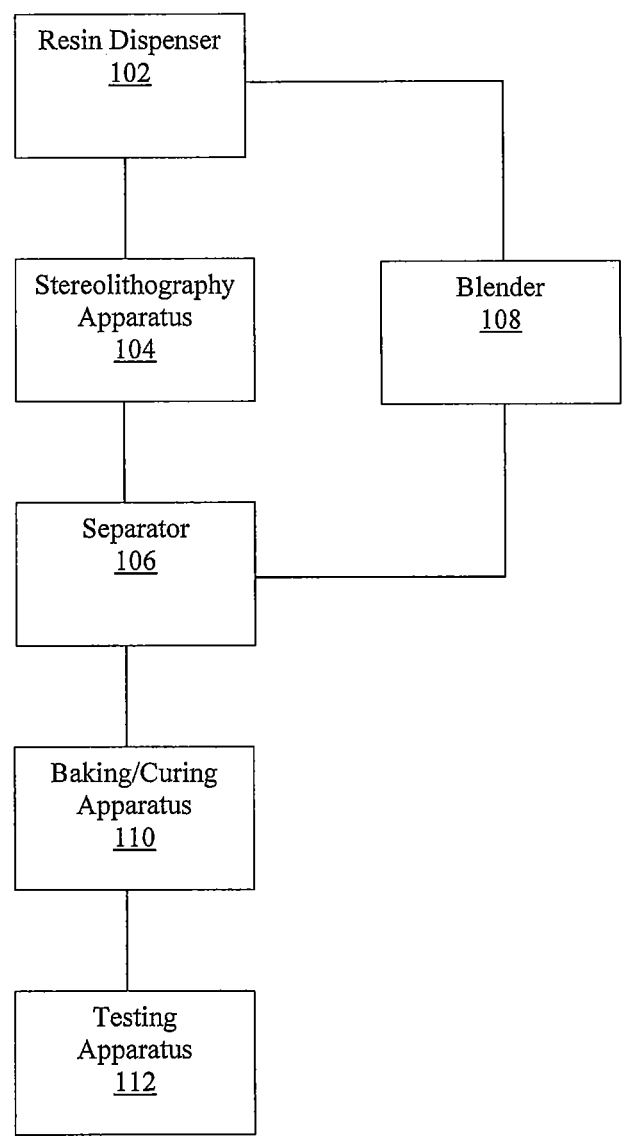
FIG. 9 schematically illustrates a system according to embodiments of the present invention.

With reference to FIG. 9, an example system (100) for carrying out additive manufacturing, includes:

(a) a resin dispenser (102) for dispensing a dual cure resin;

(b) at least one stereolithography apparatus (104) operatively associated with the resin dispenser;

(c) a separator (106) (e.g., a centrifugal separator) configured for separating excess resin retained on the surface of objects produced on the stereolithography apparatus (see, e.g., FIG. 6); and (d) a blender (108) operatively associated with the separator and configured for mixing excess resin with additional dual cure resin to produce a blended resin, the blended resin useful for carrying out additive manufacturing in the at least one stereolithography apparatus.

The system may include a baking or further curing apparatus (110) and/or a testing apparatus (112) configured to carry out the testing described herein.

The foregoing is illustrative of the present invention, and is not to be construed as limiting thereof. The invention is defined by the following claims, with equivalents of the claims to be included therein.

We claim:

1. A method of separating excess resin from at least one object, comprising:

(a) stereolithographically producing at least one object, each said object having at least one retention feature formed thereon, each said object carrying excess resin on a surface thereof; then (b) mounting each said at least one object on at least one transfer frame, each said transfer frame having at least one retention member that mates with said retention feature;

(c) connecting each said transfer frame to a rotor with said at least one object carried thereon;

(d) centrifugally separating excess resin from each said object by spinning said rotor with each said transfer frame connected thereto while said at least one object remains connected to each said transfer frame by said retention feature; then (e) removing each said transfer frame from said rotor, with excess resin separated from each said at least one object thereon, wherein said rotor comprises a drive and a horizontal base plate connected to said drive, with each said transfer frame configured for connecting to said base plate.

2. The method of claim 1, wherein said retention feature comprises at least one channel, at least one slot, at least one ledge, a frame partially or completely surrounding the object, or a combination of any thereof.

3. The method of claim 1, wherein said retention member comprises one or more rods.

4. The method of claim 1, wherein said rotor comprises a removable top plate, with each said transfer frame configured for connecting to said removable top plate.

5. The method of claim 4, wherein said rotor further comprises a plurality of spacer posts connected to or extending from said base plate, said spacer posts configured for positioning said removable top plate above and oriented with each said transfer frame.

6. The method of claim 4, each said transfer frame including:
a first interconnecting element configured for removably connecting said transfer frame to said base plate; and
optionally a second interconnecting element continuous with or separate from said retention member configured for removably connecting said top plate to said transfer frame.

7. The method of claim 1, wherein a plurality of objects are mounted on each said transfer frame.

8. The method of claim 1, wherein a plurality of transfer frames are connected to said rotor.

9. The method of claim 1, wherein said centrifugally separating step is carried out with each said transfer frame mounted perpendicularly to said base plate, and/or parallel to an axis of rotation of said rotor.

10. The method of claim 1, further comprising warming said excess resin sufficiently to reduce the viscosity thereof during said centrifugally separating step.

11. The method of claim 1, further comprising applying a solvent to said excess resin in an amount sufficient to reduce the viscosity thereof during said centrifugally separating step.

12. The method of claim 1, wherein said centrifugally separating step is carried out in a gas at ambient pressure or a pressure less than ambient pressure.

13. The method of claim 1, wherein said spinning is carried out at a speed of from 100, 200 or 400 revolutions per minute (rpm) to 600, 800, 1,000 or 1,2000 rpm, or more.

14. The method of claim 1, further comprising:
(f) collecting said centrifugally separated excess resin, then
(g) combining said centrifugally separated excess resin with additional resin; and then
(h) stereolithographically producing at least one additional object from said centrifugally separated excess resin and/or said additional resin.

15. The method of claim 1, wherein each said object comprises an intermediate object produced from a dual cure resin, the method further comprising:
(i) optionally separating each said object from each said transfer frame; and then
(j) further curing each said object on or off each said transfer frame to produce a finished object.

16. The method of claim 1, wherein each said object comprises a lattice and/or includes one or more internal channels or cavities and has at least one opening formed therein in fluid communication with the one or more internal channels or cavities and configured for excess resin within the one or more internal channels or cavities to flow therethrough and out of the one or more internal channels or cavities during the centrifugally separating step.

17. An apparatus useful for separating excess resin from at least one stereolithographically produced object, comprising:
(a) at least one stereolithographically produced object, each said object having at least one retention feature formed thereon, each said object carrying excess resin on a surface thereof;
(b) at least one transfer frame, each said transfer frame having at least one retention member that mates with said retention feature, at least one of each said at least one stereolithographically produced object mounted on each said at least one transfer frame; and
(c) a rotor, each said at least one transfer frame connected to said rotor,
wherein said rotor comprises a drive and a horizontal base plate connected to said drive, with each said transfer frame configured for connecting to said base plate.

18. The apparatus of claim 17, wherein said retention feature comprises at least one channel, at least one slot, at least one ledge, a frame partially or completely surrounding said object, or a combination of any thereof.

19. The apparatus of claim 17, wherein said retention member comprises one or more rods.

20. The apparatus of claim 17, wherein said rotor comprises a removable top plate, with each said transfer frame configured for connecting to said removable top plate.

21. The apparatus of claim 20, wherein said rotor further comprises a plurality of spacer posts connected to or extending from said base plate, said spacer posts configured for positioning said removable top plate above and oriented with each said transfer frame.

22. The apparatus of claim 20, each said transfer frame including:
a first interconnecting element configured for removably connecting said transfer frame to said base plate; and
optionally a second interconnecting element continuous with or separate from said retention member configured for removably connecting said top plate when present to said transfer frame.

23. The apparatus of claim 17, wherein a plurality of said objects are mounted on each said at least one transfer frame.

24. The apparatus of claim 17, wherein a plurality of transfer frames are connected to said rotor.

25. The apparatus of claim 17, wherein each said transfer frame is mounted perpendicularly to said base plate, and/or parallel to an axis of rotation of said rotor.

26. The apparatus of claim 17, wherein each said object comprises a lattice and/or includes one or more internal channels or cavities and has at least one opening formed therein in fluid communication with the one or more internal channels or cavities and configured for excess resin within the one or more internal channels or cavities to flow therethrough and out of the one or more internal channels or cavities when said excess resin is centrifugally separated from each said object by spinning said rotor with each said transfer frame connected thereto while each said at least one object remains connected to each said transfer frame by said retention feature.

* * * * *

UNITED STATES PATENT AND TRADEMARK OFFICE
CERTIFICATE OF CORRECTION

PATENT NO. : 11,919,236 B2
APPLICATION NO. : 17/272470
DATED : March 5, 2024
INVENTOR(S) : Day et al.

It is certified that error appears in the above-identified patent and that said Letters Patent is hereby corrected as shown below:

In the Specification

Column 4, Line 59: Please correct "elements compo-" to read --elements, compo- --

In the Claims

Column 14, Line 45, Claim 22: Please correct "top plate when present to said transfer frame." to read --top plate to said transfer frame.--

Signed and Sealed this
First Day of October, 2024

Katherine Kelly Vidal
Director of the United States Patent and Trademark Office